US007126979B2

(12) United States Patent
Karlsson

(10) Patent No.: US 7,126,979 B2
(45) Date of Patent: Oct. 24, 2006

(54) SYSTEM AND METHOD TO AUTONOMOUSLY AND SELECTIVELY JAM FREQUENCY HOPPING SIGNALS IN NEAR REAL-TIME

(75) Inventor: Lars Karlsson, Santa Clara, CA (US)

(73) Assignee: Networkfab Corporation, Santa Clara, CA (US)

( * ) Notice: Subject to any disclaimer, the term of this patent is extended or adjusted under 35 U.S.C. 154(b) by 170 days.

(21) Appl. No.: 10/912,976

(22) Filed: Aug. 6, 2004

(65) Prior Publication Data

US 2005/0041728 A1 Feb. 24, 2005

Related U.S. Application Data

(63) Continuation-in-part of application No. 10/829,858, filed on Apr. 21, 2004.

(60) Provisional application No. 60/495,831, filed on Aug. 18, 2003.

(51) Int. Cl.
*H04B 1/69* (2006.01)
*H04K 3/00* (2006.01)
*H04K 1/10* (2006.01)

(52) U.S. Cl. ........................ 375/130; 375/260; 342/14; 455/1

(58) Field of Classification Search ........ 375/130–135, 375/138, 139, 141, 144–146, 260, 262, 344, 375/346, 350; 455/1; 342/14, 17; 398/391
See application file for complete search history.

(56) References Cited

U.S. PATENT DOCUMENTS

| | | | | |
|---|---|---|---|---|
| 6,036,351 | A * | 3/2000 | Wagstaff | 708/321 |
| 6,335,953 | B1 * | 1/2002 | Sanderford et al. | 375/344 |
| 2002/0051498 | A1 * | 5/2002 | Thomas et al. | 375/262 |
| 2003/0103589 | A1 * | 6/2003 | Nohara et al. | 375/350 |
| 2004/0042568 | A1 * | 3/2004 | Rowitch | 375/346 |
| 2004/0243258 | A1 * | 12/2004 | Shattil | 700/73 |

* cited by examiner

*Primary Examiner*—Don N. Vo
(74) *Attorney, Agent, or Firm*—Steins & Associates, P.C.

(57) ABSTRACT

The system and method autonomously and selectively jams frequency-hopping signals in near real-time by incorporating a fundamental change in the detection and reaction technology, to provide a reaction time that is short enough, within milliseconds or less, to capture and then jam even the fastest frequency hopping radios in use today, without relying on prior art methods of using standard CPU driven technology.

The system automatically determines if detected signal(s) should be jammed, and subsequently to automatically end extremely quickly activates the jamming transmitter on the frequency-hopper transmitter's frequency. Finally, the system provides a programmable user interface so that operators can set up the system to act autonomously as intended, such that operator intervention is unnecessary when the system is placed in jamming operation mode.

15 Claims, 5 Drawing Sheets

Cycle Generator Functional Timing Diagram

SYSTEM AND METHOD TO AUTONOMOUSLY AND SELECTIVELY JAM FREQUENCY HOPPING SIGNALS IN NEAR REAL-TIME

This application is a continuation-in-part of application Ser. No. 10/829,858, filed Apr. 21, 2004, now pending.

This application is filed within one year of, and claims priority to Provisional Application Ser. No. 60/495,831, filed Aug. 18, 2003.

BACKGROUND OF THE INVENTION

1. Field of the Invention

This invention relates to advanced military grade communications jamming systems and, more specifically, to a System and Method to Autonomously and Selectively Jam Frequency Hopping Signals in Near Real-time. This unique state-of-the-art invention will have widespread use in any modem military organization that wants to achieve communications dominance and information superiority over any battlefield. The invention will add an essential, and much needed, communications and electronic warfare capability to any respective governments' national defense program.

2. Description of Related Art

Modem military grade communication systems today employ short, burst type transmissions that constantly cycle through a secret sequence of frequencies in order to prevent detection and jamming. Such systems are commonly known as frequency hoppers. Typically, these systems (both foreign and domestic) only transmit on a particular frequency for no more than a few milliseconds at the most. This creates a problem for those who want to detect and jam such transmissions as they happen so quickly. Practically, it is not feasible to simply "splash" the radio frequency spectrum with random noise in order to jam such transmissions. The reasons are that it requires an unpractical amount of power to apply sufficient RF energy to wash out all transmissions. In addition, there may be friendly transmissions that should not be jammed. Also, since the duration of the target transmissions is so short, it is not practical to have (for instance) a CPU that is programmed to evaluate signals, make a determination, and then command transmitters to jam. There is simply not enough time to engage the frequency hopping signals before they have moved on to a new frequency.

What is needed therefore in order to feasibly detect and jam these modem fast hopping transmissions is a System that has: 1) The ability to capture wide bandwidth regions of the RF spectrum instantaneously; 2) The ability to automatically discover (without CPU intervention) sudden, short duration signals as they appear; 3) The ability to automatically determine (without CPU intervention) if the signal should be jammed or not; 4) The ability to autonomously command (without CPU intervention) the jamming equipment to transmit on the appropriate frequencies; and 5) The ability to do all of these functions in near real time from the moment the signal is received.

The prior-art of FIG. 1 is a present-day jamming system. In order to find a target signal, an operator tunes the receiver. It is then up to the radio operator to manually determine if this newly captured signal should be jammed or not. If not, then the radio operator continues to search for new signals. But if the signal is determined to be a target that should be jammed, then the operator sets the controls of his jamming equipment and transmits appropriately. Periodically, the operator stops jamming to see if the signal is still present. Such an operation is called a "look-through" and is necessary in case the target has moved to a new frequency.

Such a traditional setup is suitable for the detection of relatively long duration communication signals such as voice or a low speed data links. But this simple system has several drawbacks including the fact that sudden, short duration signals are extremely unlikely to be captured. In addition, even if a short-duration signal is captured, it is impossible for the radio operator to manually jam the transmission in such a short period of time. Such systems are the oldest kind and are inadequate to jam today's modern military grade frequency hopping radios.

FIG. 2 is a flowchart depicting the functional method 76 of the system of FIG. 1. First, the operator detects a target signal 300 (manually); after deciding to jam the target signal 302, the operator must tune the jamming transmitter to the target signal's frequency 304. When ready, the operator turns on the jamming transmitter to transmit a jamming signal on the target signal frequency 306. As discussed above, periodically the operator must cease transmitting for a short time 308 so that he or she can "look through" for the target signal to see whether or not it is still transmitting on the original frequency 310. If it is still transmitting 312, the operator will re-commence transmitting a jamming signal on the original frequency 306. If, however, the target signal is not up on the same frequency 314, the operator will recommence detect/listen mode 300 and attempt to find the target signal on a new frequency (or another target transmitter).

The prior-art of FIG. 3 is a more elaborate present-day jamming system. The typical system uses a fast scanning receiver to quickly sweep through the RF spectrum looking for signals. Once captured, the frequency setting of that signal is "handed-off" to a CPU whose purpose is to determine if the signal should be jammed or not. This function is typically pre-programmed so as to not require manual intervention and speed up the turnaround time. The CPU then commands the jamming equipment to transmit as programmed.

But again, this prior-art system has many of the same drawbacks as the system of FIG. 1, including the fact that sudden, short duration signals are still very unlikely to be captured. The frequency hopping signals are on the order of milliseconds or less per "hop". Thus, the sweeping receiver must be sweeping past at the right time and at the right place where the signal appears, otherwise the hop will be missed. Also, the CPU cannot process and execute functions in less than a millisecond. Thus, the latency of this system is inadequate to jam short duration signals.

SUMMARY OF THE INVENTION

In light of the aforementioned problems associated with the prior devices and methods used by today's military organizations, it is an object of the present invention to provide a System and Method to Autonomously and Selectively Jam Frequency Hopping Signals in Near Real-time. Today's modem military grade frequency hopping radios present many problems for those who want to detect and jam such transmitters. The short duration nature of frequency hoppers makes it practically impossible to selectively jam them using today's normal methods. A system to jam such signals must be able to react within a millisecond or less.

Also, modem military frequency hopper technology is advancing quickly and thus performing transmissions in shorter and shorter duration all the time. Compounding the situation is that there is a widespread and growing proliferation of these radios across the world today, from many foreign manufacturers. It is getting increasingly difficult to conduct successful electronic attacks against these proliferating, jam resistant targets with legacy equipment and technology. Thus, a fundamental change in the detection and reaction technology is required to answer this escalating problem if any military group is to maintain information superiority over the battlefield. To address this problem, new state-of-the-art jammers are needed with reactive times short enough to capture and then jam even the fastest frequency hopping radios in use today.

It is an object of the present invention to provide just such a method to automatically detect and jam sudden, short duration communications signals in near real time. Such a system cannot rely on prior art methods of using standard CPU driven technology.

The preferred system should first have the ability to automatically detect short duration signals (such as those output from frequency hoppers). Secondly the preferred system should be able to automatically make a determination if a received signal should be jammed. Thirdly, the preferred system should then automatically and extremely quickly activate the jamming transmitter on the hoppers' frequencies. And finally, the preferred system should provide a programmable interface so that operators can set up the system to act autonomously as intended, so there is no operator intervention necessary when the preferred system goes into the jamming mode of operations.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a System and Method to Autonomously and Selectively Jam Frequency Hopping Signals in Near Real-time.

Figure 1:
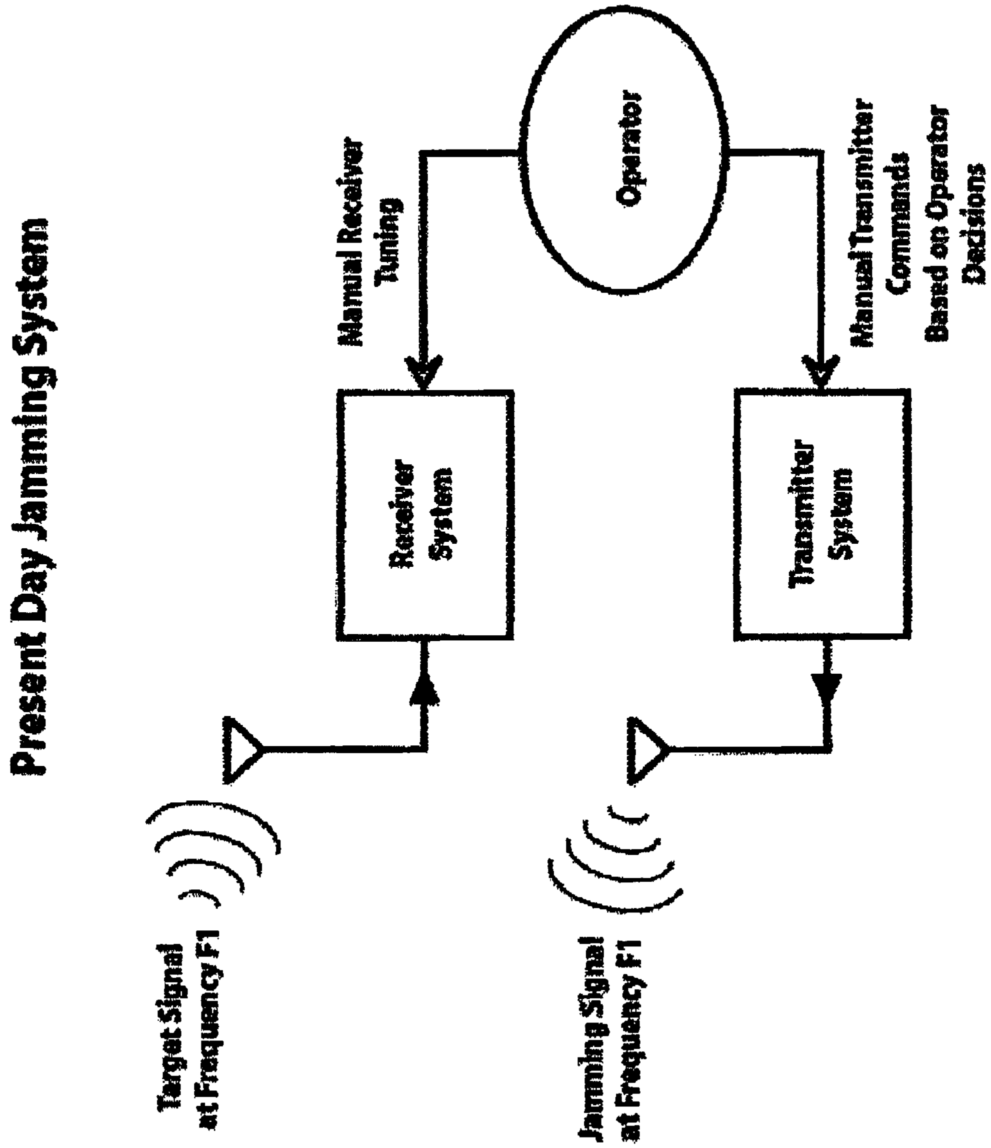
FIGURE 1 PRIOR ART
FIG. 1 is a drawing of a prior jamming system.
Figure 2:
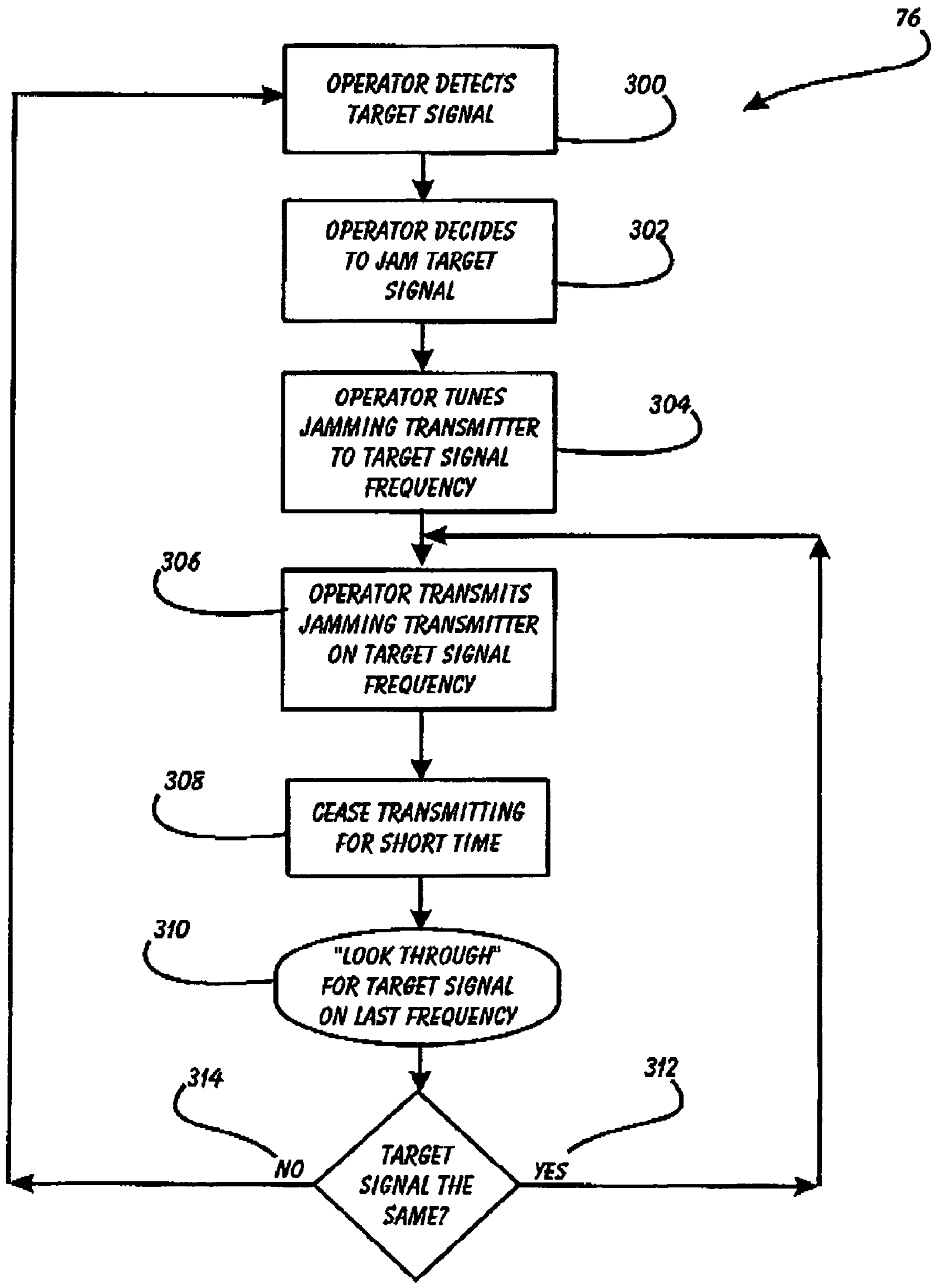
FIGURE 2 PRIOR ART
FIG. 2 is a flowchart depicting the operational method for the prior system of FIG. 1.
Figure 3:
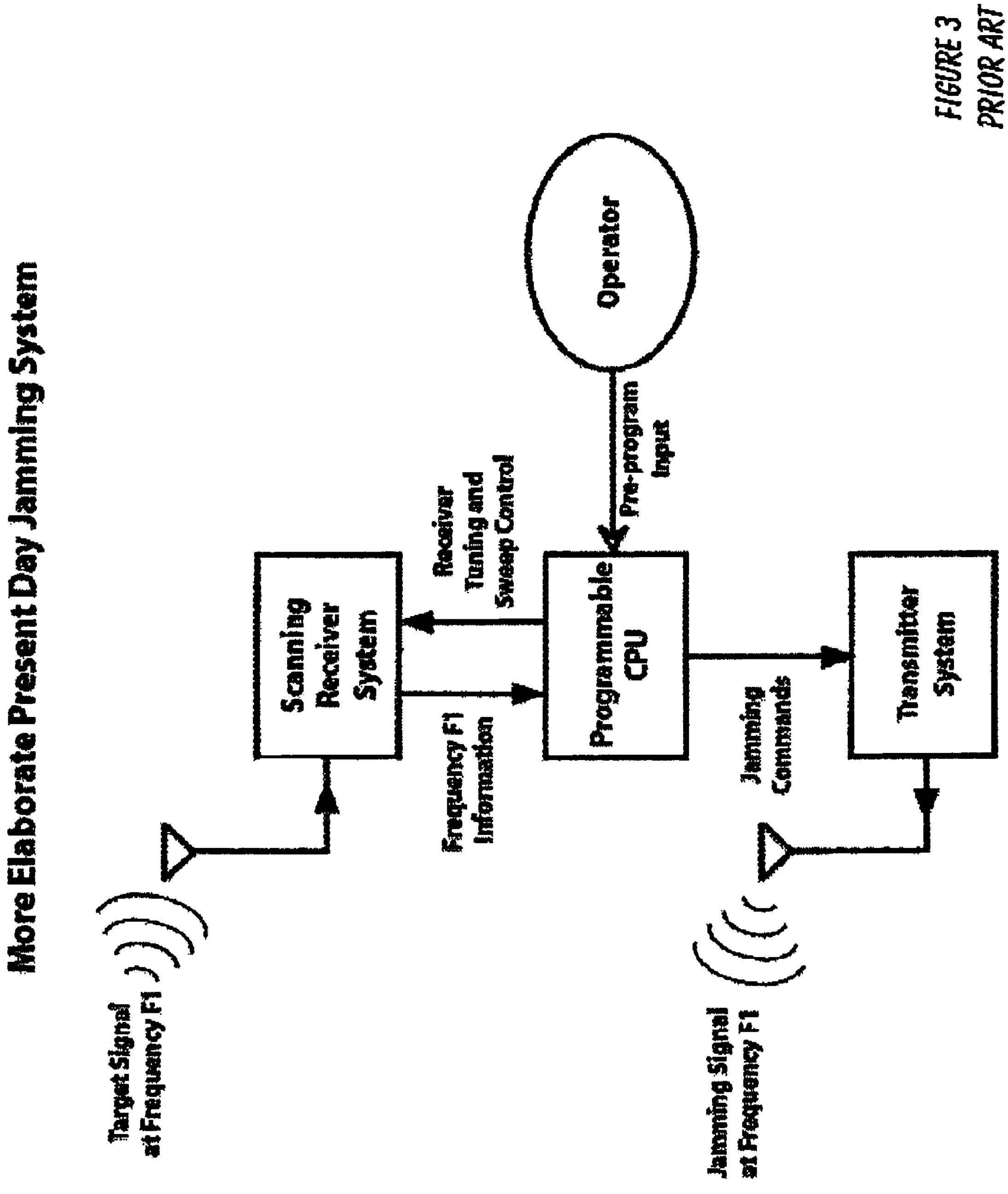
FIGURE 3 PRIOR ART
FIG. 3 is a drawing of a more elaborate prior jamming system.
Figure 4:
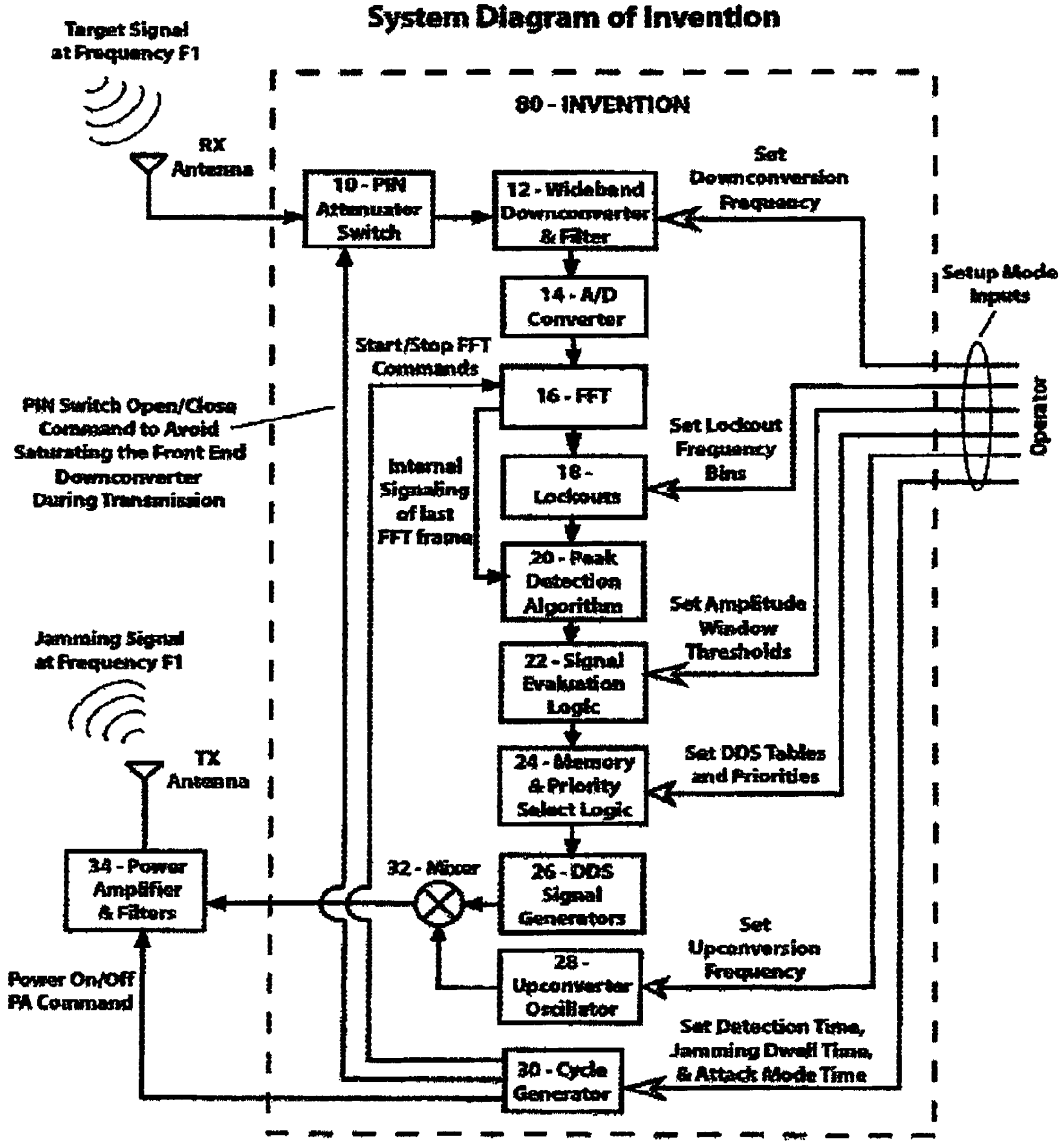
FIG. 4 is a preferred embodiment of the near real-time jamming system of the present invention.

The present invention can best be understood by initial consideration of FIG. 4. FIG. 4 is a functional depiction of a preferred embodiment of the present invention, a near real-time frequency hopper jamming system. Once armed for jamming, the system first receives and instantaneously processes a wide bandwidth of RF spectrum. The invention will then detect short duration signals such as frequency hopping signals and burst transmissions. Such suddenly appearing signals are then automatically evaluated and then automatically jammed by this invention. The combination between the automatic detection of sudden, short duration signals, and the intelligent evaluation and jamming of such signals, is very unique.

The system 80 is implemented in hardware and preset by software programming. The system 80 uses a device 12 that is a wideband front-end downconverter (i.e. a radio receiver tuner) that outputs a wideband intermediate frequency (IF). Thus all the signal information contained within the bandwidth of the IF filter can be analyzed instantly. The resulting IF output may contain one or many short duration communication signals. The front-end section of the System utilizes portions of wideband detection technology described by the patent application entitled: "Method And Apparatus For The Intelligent And Automatic Gathering Of Sudden Short Duration Communications Signals." The next sections contain the selection logic by which it is automatically determined whether or not received signals should be jammed. There are various programmable criteria. For example there is a section that determines priority for jamming, as well as a lookup table for jammer programming. The cycle generator section 30 regulates the user configurable System timing. The final section of the invention executes the jamming frequency generation and output (as determined by the previous sections), which must also occur extremely quickly. All of these processes occur in near real time. This invention is unique since no other device has the capability or performance to perform these operations this quickly.

Diagram Reference Numerals

10 PIN Diode Attenuator Switch
12 Wideband Downconverter and Filters
14 Analog-to-Digital Converter (A/D)
16 Fast Fourier Transformation Module (FFT's)
18 Lockout Logic
20 Peak Detection Algorithm
22 Signal Evaluation Algorithm
24 Memory and Priority Select Logic
26 Direct Digital Synthesizers (DDS's)
28 Upconverter Oscillator
30 Cycle Generator
32 Mixer
34 High Power Amplifier (PA) and Output Filter
80 Preferred embodiment of near-real-time jamming system of the present invention.

Operation

As a high level description, the invention described herein first basically has the hardware and method required to capture high speed frequency hopping transmissions. Then the frequencies of those detected signals are passed along through a series of decision modules to determine whether or not it should be jammed. The signal logic modules of the jammer take those results and strip out the signals that are not of interest. What remains are the signals that should be jammed and are subsequently passed on to the invention's signal generation circuitry for jammer output. All of this occurs automatically and without CPU intervention, everything is done in hardware.

To jam high speed frequency hoppers requires equipment that has extremely fast and especially precise timing. The invention of this patent application uses such a concept and implements it with a hardware module called the cycle generator 30. The jammer system has all of the timing regulated and coordinated by the cycle generator 30, which has its' timers pre-programmed in the Setup Mode. After the Setup Mode is complete and the system is properly "armed"

(please see below a discussion of Modes), the operator can begin the Attack Loop Mode by initiating the cycle generator into action which will in turn make the entire jammer system operate autonomously until the jammer is manually turned off by the user, or the attack timer expires.

During operations, a converter device 12 is first tuned to a region of the RF spectrum where the enemy frequency-hopping signals are expected to be. A PIN diode switch 10 is placed on the input to this converter device 12. At first, the PIN diode switch is naturally in the closed, or connected, position to allow signals to pass through and into the converter. Incidently, during the Attack Loop Mode of operations, this switch 10 is commanded open by the cycle generator 30 to protect the converter's 12 front-end amplifiers (so-called "blanking" of the front-end) when the System 80 is transmitting at high power RF.

As discussed above in connection with FIGS. 4 and 5, the converter 12 acts as a down-converter device to properly shift the received spectrum into a usable IF range. The wide band analog IF output is then fed through a bandpass filter and then the filtered analog IF is fed directly into the analog-to-digital (A/D) conversion component 14 for digitization. The digitized IF data is then fed to a hardware logic component that performs fast Fourier transformations (FFT). This FFT module (such as an FPGA device) performs various DSP algorithms. But the FFT function is not initiated until the cycle generator sends it the "Start FFT" command.

When the operator is ready, or upon order from military command, the cycle generator 30 is initiated. This cycle generator then sends the Start FFT command to the FFT module and the "detection timer" begins. This gets the entire jammer going and listening for enemy signals (as described above). The FFT module performs the FFT's and transforms the incoming digitized IF (which is in the time domain) to the frequency domain. The FFT length can be 1024 points or more. The output of the FFT is digital I and Q data. The I and Q data is combined by a magnitude algorithm which takes the square root of the sum of the individual squared values of I and Q. The result is the normalized amplitude of the I/Q, which is the processed spectrum. Thus the spectrum data is completely in the mathematical real domain, without any mathematical imaginary components. The amplitude of the "bins" of the FFT correspond to signal energy detected in each FFT sample of the IF bandwidth. Each FFT bin thus corresponds to a frequency point measurement across the spectrum.

The output of the FFT module is an FFT bin array of information (so-called FFT frame) that is then fed to another hardware logic component 18 (such as an FPGA) that determines if the incoming spectrums contain new signals that were preprogrammed to not be jammed. The module takes in the incoming FFT bins and excludes certain bins that the user does not want to jam. These "lockouts" are bins that translate to no-jam frequencies of friendly or coalition forces (which are provided during the System pre-programming phase—Setup Mode). These are "fixed" lockouts; there are also "real-time" lockouts that may be applied as a function of the hopping pattern that friendly and coalition forces' radios are expected to use at that current time. These real-time lockouts protect the so-called "fill of the day" hopping pattern so that they are not jammed. The result is that the FFT frame that is allowed to pass will only contain present signals that were not designated to be locked out by the jammer. These lockouts can alternatively be done at a later stage without affecting the function of the jammer. The hardware logic then takes the remaining FFT bins and performs various peak detection algorithms 20 (such as two, three or five-point methods) on the set. This algorithm 20 continually takes in new FFT bins all the time and updates the calculated output values for each bin. This is done to improve the overall signal-to-noise (S/N) of the system to receive the new signals. This process all occurs within the Setup Mode programmable "Detection Time" period. The longer detection time used, the more accurate measurement. After the detection period has expired, the cycle generator sends a "Stop FFT" command to the FFT module 16. The FFT module 16 will finish its current FFT frame generation and then pass them on to the following modules. But after that, there will be no more FFT frame generation until the very next attack cycle begins.

The FFT module 16 then sends a command to the peak detection algorithm module 20 to wait for the final FFT frame to arrive, and then to release the final values of the FFT bins and send them to the signal evaluation algorithm module 22.

This algorithm 22 makes a determination if a signal is present in each of the bins or not by using the user provided "window amplitude threshold settings" as a rule set. The window threshold settings are configurable upper and lower amplitude bounds for a signal to be declared present. These values are input during the Setup Mode phase (described below). If a signal does not land within the configurable window threshold setting, then the signal is not jammed. The idea is to not jam signals that have too high a signal strength, since they are typically considered to be from nearby (friendly) forces. If the signal is too low, then it does not meet the minimum signal threshold requirements. This avoids jamming noise spikes. If one or several targets are identified as suitable to jam by the signal evaluation logic 22, those are then sent to the priority logic algorithm module 24 of the hardware.

This priority logic algorithm module 24 decides which one of the signals (or which group of signals) will be jammed. Priority rules can be either hard coded, or configured by the user during the Setup Mode phase. Some signals might be pre-programmed to have higher importance than others for example. After a determination of which signals to jam has been made, those frequencies are matched to the proper Direct Digital Synthesizer (DDS) programming data that is determined from a lookup table.

Next, the information is then sent, along with the DDS programming data, to a Direct Digital Synthesizer module 26 (DDS) that in turn outputs the required jamming frequency, or frequencies. What is additionally unique about this invention is the method of programming the DDS chips in such a fast way so that high speed frequency hopper jamming is possible. To program DDS chips requires many CPU operations that would take precious milliseconds to accomplish. Thus, the only way to effectively program the DDS chips with enough speed is to have a pre-programmed lookup table of every single DDS programming array of bits that are matched to each and every frequency bin of the final FFT frame that comes out of the priority select logic module 24. Thus, there is no manual or CPU intervention to program the DDS chips. The DDS frequencies are generated automatically in hardware.

The output of the DDS module 26 are jammer signals. The jammer signals are then sent to an upconverter stage that contains a oscillator 28, mixer 32 and output filter. The proper final jamming frequency is then output from the System to the external high power amplifier 34 (PA) for long range transmission.

Operation Modes

As mentioned earlier, this system 80 has two major operational modes, a Setup Mode, and the Attack Loop Mode. In the Setup Mode, the operator inputs several parameters to “arm” the System properly with the right information in order to perform fast reactive jamming. For example, the System is programmed with which specific frequencies are NOT to be jammed (i.e. lockouts). This is important since friendly communications should not be attacked during a jamming cycle. The Setup Mode has several major parameters to be input prior to allowing it to go into Attack Mode.

The first Setup Mode parameter involves the tuning of the wideband downconverter 12. This is necessary so the system can “listen” in the right RF spectrum range where enemy frequency-hopping signals are expected to be.

The second Setup Mode parameter involves the programming of the memory logic, window threshold settings, and the priority selection criterion 24. In addition, the DDS setting tables are pre-loaded. The lockout memory logic 18 contains the frequencies that are “locked out” so the System will not jam those. The jammer also contains the priority selection algorithms 22 that are used to evaluate the amplitudes of the FFT bins to see whether or not there is a signal present. The DDS tables are pre-calculated arrays of DDS programming information. Each element in the array corresponds to a different frequency bin within the processed spectrum. For example, if a signal is detected in bin # 45, then that frequency has a proper DDS setting in order to jam that frequency. The DDS table thus contains the proper DDS programming information in order to quickly set the DDS chipset 26 to any frequency that a signal appears on within the IF spectrum. When a jamming signal is identified, the hardware logic 24 does a lookup on the table and feeds the correct DDS programming to the DDS 26 itself. And as mentioned, this in turn automatically makes the DDS output the proper frequency.

This method is employed because to program a DDS chipset 26 to output a frequency would take several cycles for a CPU to execute. And those cycles are too long for jamming a fast frequency hopper. Thus, pre-programming fast memory logic to output the correct DDS input which corresponds to the correct jamming signal frequency is there to make the Attack Loop time short enough to—engage fast frequency hopping signals.

The third Setup Mode parameter involves the tuning of the upconverter oscillator 30. Since the DDS chipset 26 may not have enough frequency range to do full frequency coverage, it may be necessary to do the upconversion in a separate stage. But to prepare it for the Attack Loop Mode, the upconverter oscillator 30 is set in advance so the upconverter will cover the targeted frequency range.

The fourth Setup mode parameters that need to be set involve programming the cycle generator 30. The cycle generator 30 is a set of registers that will command the System during the Attack Loop Mode. This is necessary to orchestrate the series of events in the right times, needed to successfully jam a received signal. One parameter that needs to be set is the detection time. This time is how long the System listens for incoming signals and processes the FFT’s. Another parameter that needs to be set is the jamming transmission ON time, or “jamming dwell time”. It is necessary for the System to jam for only a certain dwell time, after which the System needs to see if any of the attacked frequencies have hopped to a new location. And the final parameter that needs to be input is the attack time. The attack time is how long the invention should remain in Attack Loop Mode, before stopping and going back into Setup Mode. A manual stop can also be done at any time.

The cycle generator 30 also provides the physical signaling controls to open and close the input PIN diode switch 10 to protect the front-end downconverter 12. This is done to limit the jammer signal power into the downconverter 12 when the PA 34 is transmitting. The cycle generator 30 also sends the signal commands at the proper microsecond timing in a jamming cycle to turn on the PA 34 at the beginning of the jamming dwell period. It also turns off the PA 34 at the end of the jamming dwell period at the proper microsecond timing. After turning off the PA 34, the cycle generator 30 also opens the PIN diode switch 10 and resets the detection timer. Thus, a whole new jamming cycle can begin. This process loops over and over until the user manually cancels Attack Loop Mode, or until the system attack timer expires.

After all these parameters are set, the operator then commands the invention 80 into the Attack Loop Mode when ready, or ordered to by Military Command. In this mode, the system 80 simply monitors the RF spectrum that it was assigned to. And if any short duration frequency-hopping signal arrives within that range, the system 80 will automatically send out a jamming signal in near real time. As mentioned, the operation continues for a user programmable period of time (attack time), or until the operator manually cancels the Attack Loop Mode and brings the System back into Setup Mode.

Figure 5:
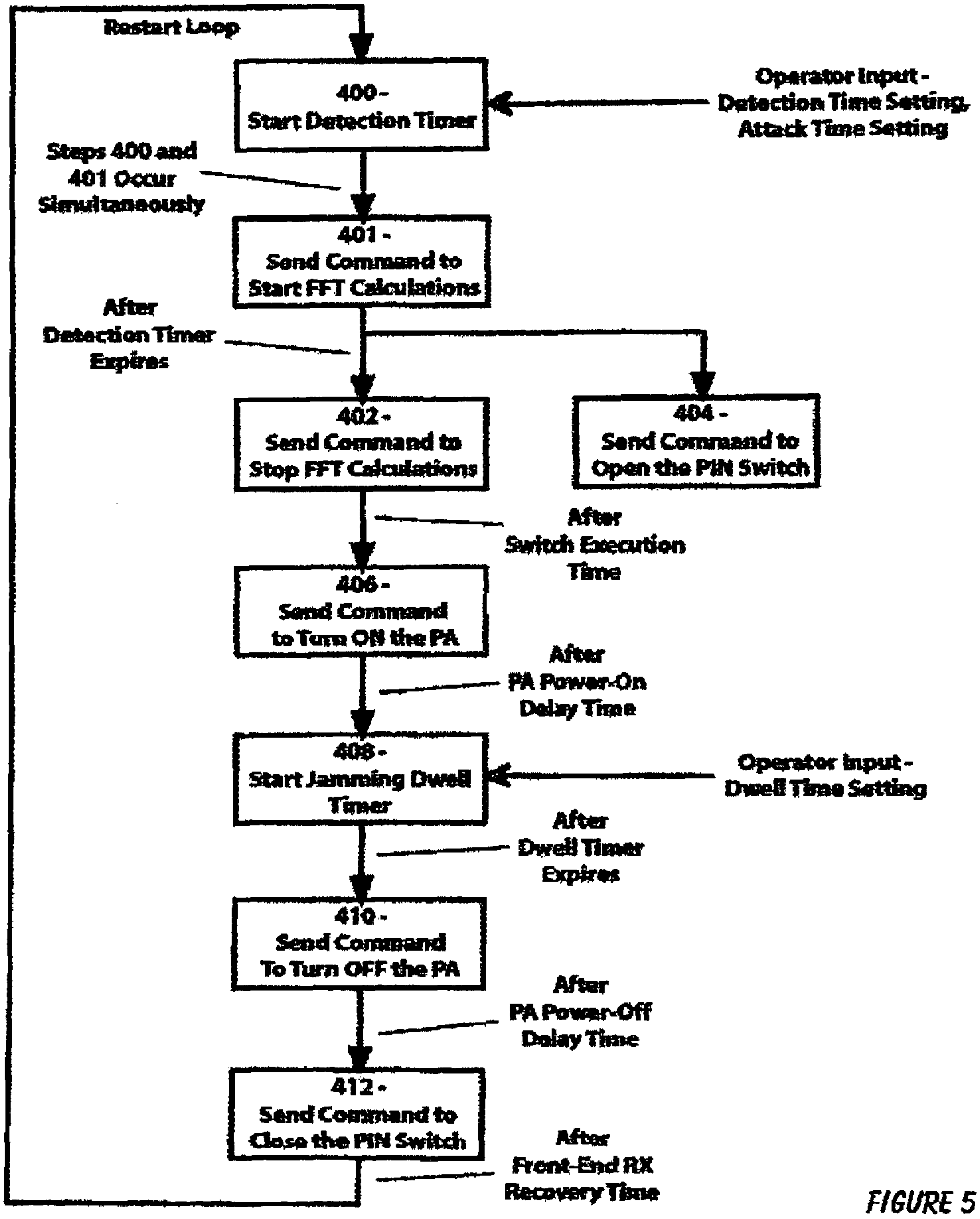
FIG. 5 is a flowchart of the operational method of the cycle timer of the system of FIG. 4.

FIG. 5 is a flowchart of the operational method of the cycle generator timer 30 of the system 80 of FIG. 4. First, the detection timer is started 400 (the operator must set up the detection and attack time settings). At the beginning of the detection period, the cycle generator sends the command to the FFT module 401 to begin calculating FFT frames from the incoming signals. Before the FFT’s are calculated, the incoming I/Q data from the A/D converter is simply “dropped on the floor”. This is done to compensate for the propagation time of the signals trough the downconverter. The data is essentially ignored until the start FFT command 401 is sent from the cycle generator 30 to the FFT module 16 at the beginning of the detection period. After the detection timer expires, the stop FFT command 402 is sent to the FFT module. Thus, the FFT module 16 will continue with its present FFT frame-calculation but no more after that. Concurrently, the FFT module 16 sends an internal signal to the peak detection algorithm module 20 informing it that the last FFT frame is on the way. Once the last FFT frame is received and processed by the peak detection module 20, the results are then passed along through the rest of the jammer system. It is interesting to note that until the FFT module 16 sends this internal signal to the peak detection algorithm module 22, the FFT frames are continually averaged and evaluated, thereby increasing the jammer system’s effective S/N ratio.

At the same time the stop FFT command 402 is sent to the FFT module 16, the PIN switch is commanded open 404 simultaneously. After the switch execution time has passed, the power amplifier is then commanded on 406. Once the PA power-on delay time has passed, the jamming dwell timer is started 408 (the operator must input the dwell timer setting, i.e. how long the jammer should jam during each cycle). Once the dwell timer expires, a command is sent to turn off the power amplifier 410, and then after the PA power-off delay time, to close the PIN switch 412—this commences the look-through period, and the detection timer is re-started 400. This cycle repeats constantly while the system 80 is in the Attack Mode.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An electronic signal jamming system, comprising:

a wideband signal collection front end, comprising:

a wideband receiver for receiving RF signals across a broad spectrum;

a digitizer for creating a continuous stream of digitized data representing said received RF signals;

a digital data conversion means for converting said digitized data into FFT frequency bins; and a signal evaluation logic module, comprising:

a comparing means for comparing each said frequency bin to configurable preset lockout frequency bins;

a peak detection means for evaluating and calculating the amplitude value for each bin by using a configurable number of data point samples for each of those bins;

a windowing means for evaluating and calculating the amplitude value for each bin by using a configurable number of data point samples for each of those bins a priority selection means for evaluating the prioritization of jammer signal targets based upon configurable settings; and an internal transmitter also responsive to said comparing, peak detection, windowing, and priority logic for transmitting a jamming signal on said frequency of interest; and an internal cycle generator timing circuit for the proper high-speed automatic triggering of all modules of the electronic signal jamming system.

2. The system of claim 1, wherein said digital data conversion means comprises means for converting said digitized data from a time domain to a frequency domain.

3. The system of claim 2, wherein said digital data conversion means comprises means for converting said frequency domain converted data from separate real and imaginary components to normalized amplitude data.

4. The system of claim 3, wherein said normalized amplitude data is categorized by frequency bins.

5. The system of claim 4, wherein said comparing means comprises comparing data in said frequency bins to frequency lockouts.

6. The system of claim 5, further comprising peak detection means for evaluating the amplitude of said frequency bins.

7. The system of claim 6, wherein said windowing means for evaluating each bin to be within configurable amplitude bound limits.

8. The system of claim 7, further comprising means for comparing said amplitude-evaluated signal to a pre-established signal priority list.

9. The system of claim 8, wherein said signal priority logic means further compares said amplitude-evaluated signal to a real-time priority request.

10. A method for jamming RF signal transmissions, comprising the steps of:

detecting an analog RF signal transmission;

digitizing said detected RF signal;

converting said digitized signal into frequency bins;

comparing said frequency bins to configurable lockout frequency bins;

evaluating and calculating the amplitude value for each said bin by using a configurable number of data point samples for each of those bins;

evaluating the prioritization of jammer signal targets based upon configurable settings;

triggering said start of the conversion of said digitized signals into said frequency bins;

triggering the end of the conversion of said digitized signals into said frequency bins;

triggering the release of frequency bin information at the correct time;

triggering of the external power amplifier at the correct time to prepare for jammer signals;

automatic programming of a digital signal generator to generate a jamming signal, said signal generator triggering responsive to said comparing.

11. The method of claim 10, further comprising an attenuator switching step, responsive to said digital signal generator, wherein an attenuator switch means for shielding the RF receiver system performing said receiving step is actuated.

12. The method of claim 11, further comprising the proper triggering of all internal and external elements of the electronic jamming system.

13. The method of claim 12, further comprising a lockout step prior to said comparing step, said lockout step comprising comparing said converted digitized signals to a dynamic list of lockout frequency bins.

14. The method of claim 13, further comprising a signal threshold-comparing step prior to said comparing step, comprising comparing said frequency bins to signal threshold settings.

15. The method of claim 14, wherein said digital transmitter triggering step is responsive to said signal threshold-comparing step.

* * * * *